United States Patent [19]

Uesugi

[11] Patent Number: 5,214,367

[45] Date of Patent: May 25, 1993

[54] CONTROLLER FOR COMPRESSOR DRIVEN BY INDUCTION MOTOR

[75] Inventor: Michika Uesugi, Fuji, Japan

[73] Assignee: Kabushiki Kaisha Toshiba, Kawasaki, Japan

[21] Appl. No.: 706,363

[22] Filed: May 28, 1991

[30] Foreign Application Priority Data

May 30, 1990 [JP] Japan ................. 2-140497

[51] Int. Cl.$^5$ ............................................. H02P 5/40
[52] U.S. Cl. ....................................... 318/803; 318/805
[58] Field of Search ............... 318/725, 728, 799, 800, 318/801, 803–811

[56] References Cited

U.S. PATENT DOCUMENTS

| | | | |
|---|---|---|---|
| 4,215,305 | 7/1980 | D'Atre et al. | 318/803 |
| 4,490,666 | 12/1984 | Tanamachi et al. | 318/800 |
| 4,734,634 | 3/1988 | Kito et al. | 318/808 |
| 4,745,991 | 5/1988 | Tanahashi | 318/801 |
| 4,763,058 | 8/1988 | Heining et al. | 318/807 |
| 4,879,502 | 11/1989 | Endo et al. | 318/808 |
| 5,015,153 | 5/1991 | Uesugi et al. | 318/799 |

FOREIGN PATENT DOCUMENTS 57-3582 1/1982 Japan.
62-37190 2/1990 Japan.

Primary Examiner—William M. Shoop, Jr.
Assistant Examiner—John W. Cabeca
Attorney, Agent, or Firm—Foley & Lardner

[57] ABSTRACT

A d.c. input current to a variable-voltage, variable-frequency inverter is detected, the inverter variable-speed driving a compressor which has a load torque changing with the rotary position and driven by an induction motor. The detected d.c. input current is sampled in synchronization with the timing, when the inductive load components of a current flowing through the induction motor become null. The sampled current value is output as a slip signal of the induction motor. A compensated d.c. voltage command is derived from the slip signal, and the input voltage to the inverter is regulated in accordance with the compensated d.c. voltage command.

3 Claims, 5 Drawing Sheets

CONTROLLER FOR COMPRESSOR DRIVEN BY INDUCTION MOTOR

FIELD OF THE INVENTION

The present invention relates to a controller for a compressor which is driven by an induction motor.

BACKGROUND ART

A system for changing the driving speed of a compressor over a wide range has been used heretofore. In this system, an induction motor operatively connected to a compressor is driven by a variable-voltage and variable-frequency (VVVF) inverter. As an inverter of this type, there is known a three-phase inverter circuit having six transistors in a Graetz connection each having a current recirculating diode inversely connected in parallel therewith. With such an inverter, the pulse widths for turning on and off the transistors are controlled so as to obtain a desired output frequency and voltage upon input of a constant d.c. voltage. Various methods of calculating the pulse widths have been proposed, so the details thereof are omitted herein. A d.c. current supplied to the inverter is converted into a variable-voltage and variable-frequency pseudo sine wave a.c. current through the turn-on/off of transistors.

The load torque of a compressor generally changes with a rotary position during one revolution. The load torque change causes rotation vibrations, particularly large vibrations within a low frequency range.

Furthermore, the load torque charge causes a higher or lower actual voltage than an optimum voltage, thereby lowering the motor efficiency.

Still further, pulse widths within a range where both the inverter output frequency and voltage are low, become too narrow, thereby generating large vibration sounds in synchronism with the turn-on/off of inverter switching elements.

SUMMARY OF THE INVENTION

The present invention has been made in consideration of the above-described problems associated with conventional apparatuses. It is an object of this invention to provide a controller for a compressor capable of suppressing vibrations of a driving motor, and noises, respectively, within a low frequency range, and effective for improving operating efficiency.

In order to achieve these objects, the present invention provides a slip detecting apparatus for detecting any slip of an induction motor which is controlled by an inverter having switching elements for converting a d.c. current into a variable-voltage and variable-frequency pseudo sine wave a.c. current through turn-on/off of the switching elements. The slip detecting apparatus comprises: a current detecting means for generating a voltage signal representative of a d.c. input current to the inverter; a timing signal generating means for generating a timing signal which synchronizes with the timing when the inductive load components of a current flowing through the induction motor become null; and sampling means for sampling the voltage signal representative of the d.c. input current in synchronism with the timing signal and outputting the sampled value as a slip signal of the induction motor.

The load impedance of an induction motor can be divided into resistive components and inductive components. A current of each phase flowing through the inductive components changes from a negative value to a positive value for a predetermined electrical angle, with a zero-cross point at the center of the electrical angle being 60 degrees. On the other hand, a current of each phase flowing through the resistive components changes with a load torque during one cycle of the inverter. Therefore, if the d.c. input current to the inverter is sampled at the time when the induction motor current flowing through the inductive components is null, the sampled d.c. current value is a value proportional to the torque, i.e., slip, of the induction motor. The slip detecting apparatus of this invention pays attention to this fact. According to this invention, a d.c. input current to an inverter is sampled in synchronism with a timing signal which is generated when the inductive load components of a current become null, the sampled value being outputted as a slip signal. It is therefore possible to detect a slip using a simple circuit arrangement and with high precision.

The present invention also provides a controller for a compressor comprising: an inverter having switching elements for converting a d.c. current into a variable-voltage and variable-frequency pseudo sine wave a.c. current through turn-on/off of the switching elements, and supplying the pseudo sine wave a.c. current to an induction motor for driving a compressor; voltage regulating means for regulating a d.c. input voltage to the inverter; current detecting means for generating a voltage signal representative of a d.c. input current to the inverter; timing signal generating means for generating a timing signal which synchronizes with the timing when the inductive load components of a current flowing through the induction motor become null; sampling means for sampling the voltage signal representative of the d.c. input current in synchronism with the timing signal and outputting the sampled value as a slip signal of the induction motor; and voltage controlling means for supplying the slip signal from the sampling means to the voltage regulating means as an output voltage command.

The present invention also provides a speed controller for a compressor comprising: an inverter having switching elements for converting a d.c. current into a variable-voltage and variable-frequency pseudo sine wave a.c. current through turn-on/off of the switching elements, and supplying the pseudo sine wave a.c. current to an induction motor for driving a compressor; voltage regulating means for regulating a d.c. input voltage to the inverter; current detecting means for generating a voltage signal representative of a d.c. input current to the inverter; timing signal generating means for generating a first timing signal which synchronizes with the timing when the inductive load components of a current flowing through the induction motor become null, and a second timing signal delayed by one half period relative to the first timing signal; sampling means for sampling the voltage signal representative of the d.c. input current in synchronism with the first timing signal to obtain a slip output sampling value, holding the slip output sampling value for one cycle of the output frequency of the inverter, and outputting, as a slip signal of the induction motor, the slip output sampling value delayed by one cycle at the second timing signal; and voltage controlling means for supplying the slip signal from the sampling means to the voltage regulating means as an output voltage command.

According to the controller for a compressor of this invention, the voltage regulating means is provided at the front stage of the inverter, and an output of the slip detecting means is used as a voltage command for controlling the voltage regulating means. Therefore, even the load of the compressor changes with the rotary angle of the compressor, a voltage corresponding to such a change is applied, thereby suppressing vibrations and noises within a low frequency output range and improving the operating efficiency.

In the above case, there are generated the first and second timing signals. The first timing signal is synchronous with the timing when the inductive load components of a current flowing through the induction motor become null. The second timing signal is shifted by a half period relative to the first timing signal. The detected d.c. input current value is sampled in synchronism with the first timing signal, and held for one cycle of the inverter output frequency. The sampled and held signal is outputted as a slip signal of the induction motor at the second timing signal delayed by one cycle, thereby allowing the effective control of the induction motor with substantially no time delay.

DESCRIPTION OF THE PREFERRED EMBODIMENT

Figure 1:
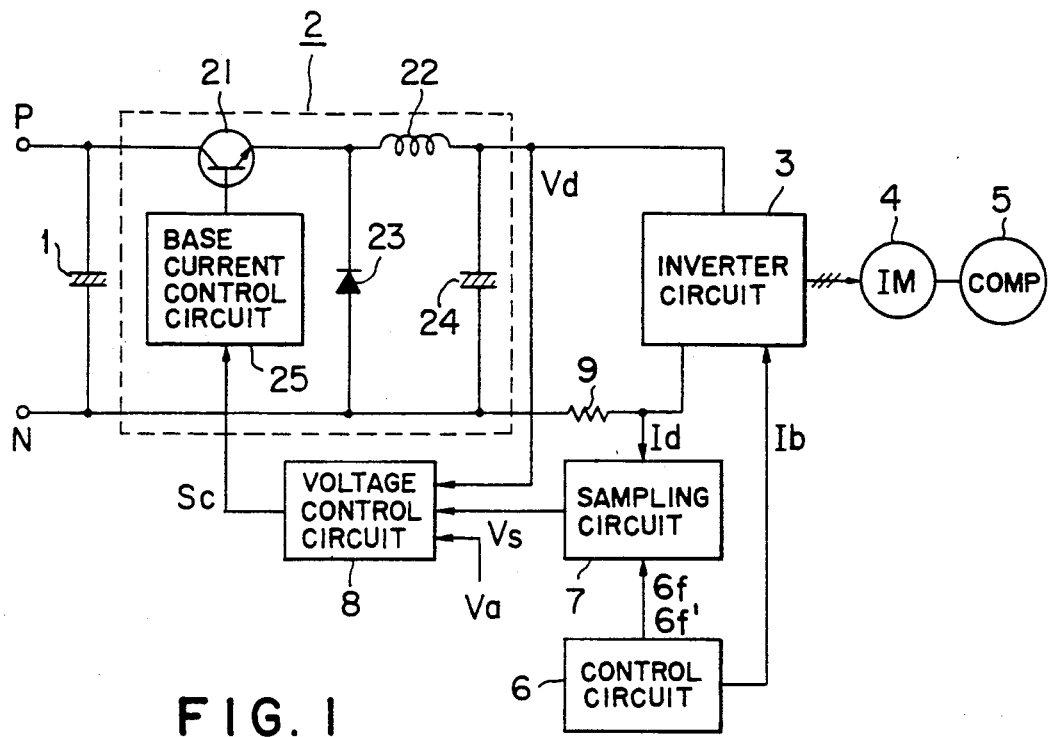
FIG. 1 is a block diagram showing an embodiment of the controller according to the present invention.

FIG. 1 is a block diagram, partially in circuit diagram, of the controller according to an embodiment of this invention. In FIG. 1, a smoothing capacitor 1 smoothes a d.c. current applied to d.c. input terminals P and N. A voltage dropping chopper 2 as voltage regulating means is connected across the smoothing capacitor 1. The voltage dropping chopper 2 is constructed of a transistor 21, a reactor 22, a current recirculating diode 23, a smoothing capacitor 24, and a base current control circuit 25. The transistor 21 is serially connected to the positive line of the d.c. power source lines. The reactor 22 functions to prevent an output current from being lowered even if the operating frequency of a compressor changes. The current recirculating diode 23 is connected between the negative line of the d.c. power source lines and an interconnection between the transistor 21 and the reactor 22. The smoothing capacitor 24 is connected between the load side of the reactor 22 and the negative line of the d.c. power source lines. The base current control circuit 25 controls the base current of the transistor 21. The output terminals of the voltage dropping chopper 2 are connected to d.c. terminals of a voltage type inverter circuit 3. The a.c. terminals of the inverter circuit 3 are connected to an induction motor (IM) 4. This induction motor 4 is operatively connected to a compressor (COMP) 5 disposed, for example, in the freezing cycle to drive it.

A control circuit 6 is provided for generating a base driving signal $I_b$ necessary for the control of the inverter circuit 3, and timing signals $6f$ and $6f'$ necessary for the control of the voltage dropping chopper 2. The base driving signal $I_b$ is supplied to the inverter circuit 3, whereas the timing signals $6f$ and $6f'$ are supplied to a sampling circuit 7. A current detecting resistor 9 is interposed on the negative line of the power source lines of the inverter circuit 3. A voltage signal $I_d$ across the resistor 9 representative of a d.c. current flowing through the negative side power source line is supplied to the sampling circuit 7. The sampling circuit obtains a slip of the induction motor 4 in accordance with the timing signals $6f$ and $6f'$, and with the voltage signal $I_d$, and further obtains a d.c. voltage command $V_s$ in accordance with the slip. The voltage control circuit 8 obtains a control signal $S_c$ in accordance with the d.c. voltage command $V_s$, an output voltage $V_d$ of the voltage dropping chopper 2, and an average voltage command $V_a$ output from a microcomputer (not shown). The control signal $S_c$ is supplied to the base current control circuit 25.

Figure 2:
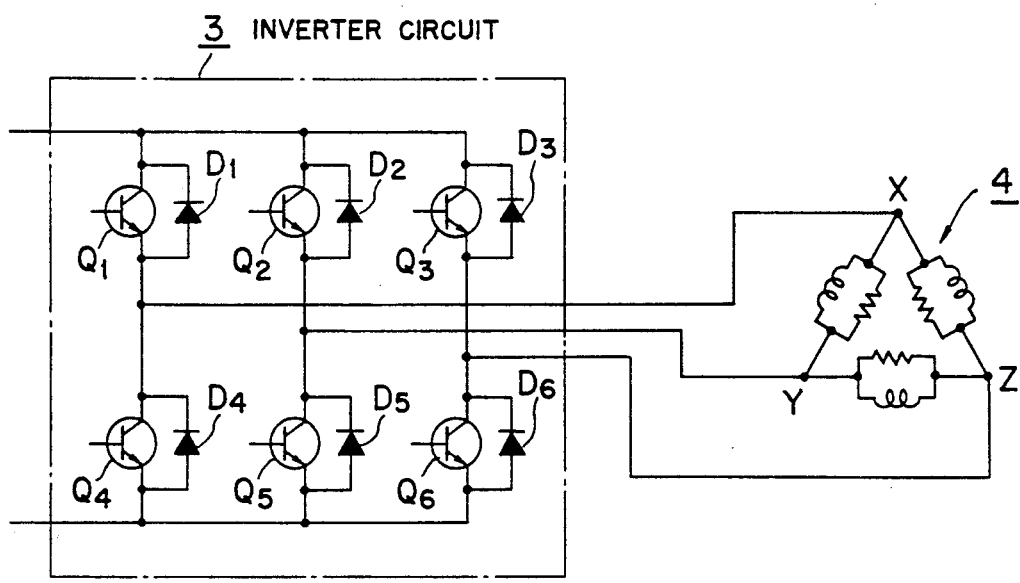
FIG. 2 is a circuit diagram of tte inverter circuit shown in FIG. 1.

FIG. 2 is a circuit diagram showing the detailed arrangement of the inverter circui-. 3 wherein six transistors $Q_1$ to $Q_6$ each having a current recirculating diode $D_1$ to $D_6$ connected in antiparallel therewith are arranged in a Graetz connection. A three-phase pseudo sine wave alternating current is derived from three interconnections between transistors $Q_1$ and $Q_4$, $Q_2$ and $Q_5$, and $Q_3$ and $Q_6$, and supplied to the induction motor 4. The induction motor 4 can be regarded as a load composed of a parallel circuit of a resistor and a capacitor, as shown in FIG. 2.

Figure 3:
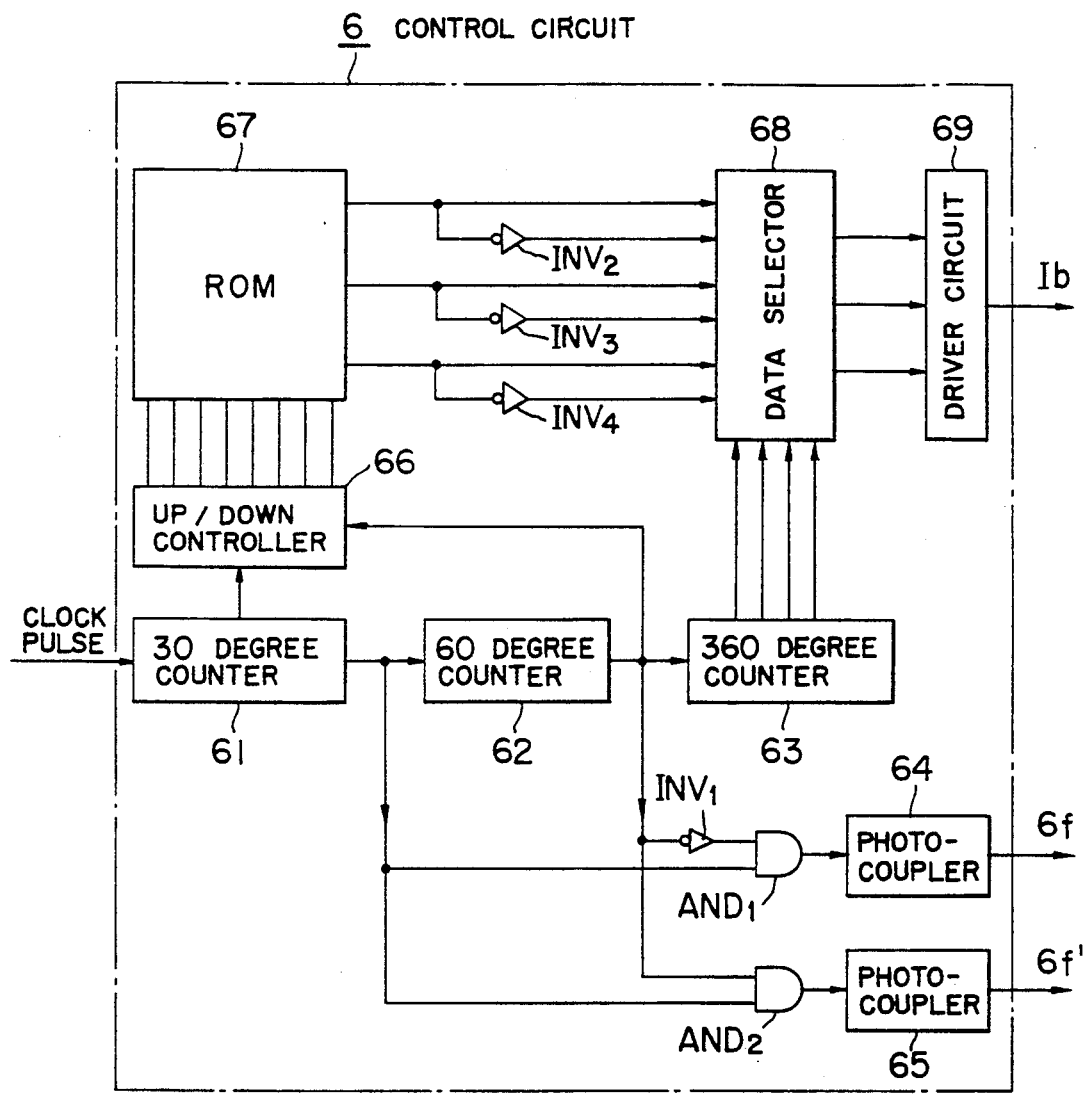
FIG. 3 is a block diagram showing the details of a control circuit of the controller showr in FIG. 1.

FIG. 3 is a block diagram showing the detailed arrangement of the control circuit 6. A 30 degree counter 61 counts clock pulses having a central frequency of about 7.2 MHz and outputs a pulse signal for every 30 degrees electrical angle. Receiving the pulse signals, a 60 degree counter 62 outputs a signal whose level is inverted for every 60 degrees electrical angle. Receiving the signals from the 60 degree counter 62, a 360 degree counter 63 generates a data select signal which is supplied to a data selector 68. The output of the 30 degree counter 61 is also applied to one input terminal of an AND gate $AND_1$. The output of the 60 degree counter 62 inverted by an inverter $INV_1$ is applied to the other input terminal of the AND gate $AND_1$. The AND gate $AND_1$ obtains a logical product of the two inputs, and outputs it as the timing signal $6f$ from a photocoupler 64. The output of the 30 degree counter 61 is also applied to one input terminal of an AND gate $AND_2$. The output of the 60 degree counter 62 is also applied to the other input terminal of the AND gate $AND_2$. The AND gate $AND_2$ obtains a logical product of the two inputs, and outputs it at the timing signal $6f'$ from a photocoupler 65. A ROM 67 stores control data in association with an inverter output voltage over a 30 degree range. An up/down controller 62 designates a data read address in accordance with the count of the 30 degree counter 61 and the output of the 60 degree counter 62. Control data for three phases read from ROM 67 together with control data inverted by inverters $INV_2$ to $INV_4$ are supplied to the data selector 68. The data selector 68 selectively outputs the control data in accordance with the output of the 360 degree counter 63. The selected control data is converted by the driver circuit 69 into the base driving signal $I_b$.

Figure 4:
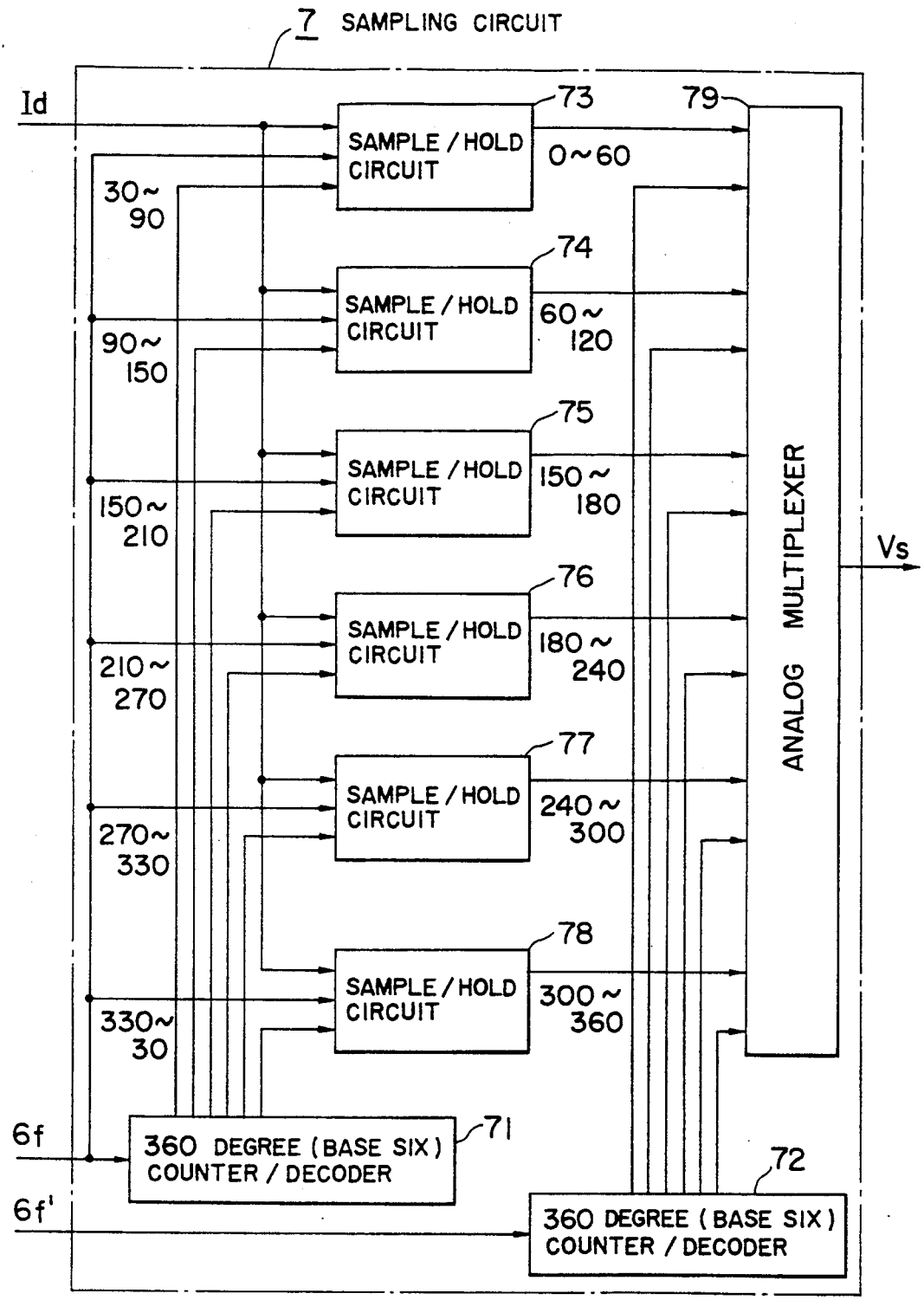
FIG. 4 is a block diagram showing the details of a sampling circuit of the controller shoWn in FIG. 1.

FIG. 4 is a block diagram shc,wing the detailed arrangement of the sampling circuit 7. In FIG. 4, the timing signal $6f$ is decoded by a 360 degree counter/decoder 71 into pulse signals each shifted by 60 degrees. The other timing signal 6f′ is decoded by a 360 degree counter/decoder 72 into pulse signals each shifted by 60 degrees. In response to the timing signal 6f and the pulse signals from the 360 degree counter/decoder 71, sample/hold circuits 73 to 78 sample and hold the voltage signal $I_d$ representative of the d.c. input current. In response to the pulse signals from the 360 degree counter/decoder 72, an analog multiplexer 79 selects the outputs from the sample/hold circuits 73 to 78 and outputs it as a d.c. voltage command $V_s$ (instantaneous value) corresponding to the slip of the induction motor 4. This d.c. voltage command $V_s$ may be used also as a slip signal.

Figure 5:
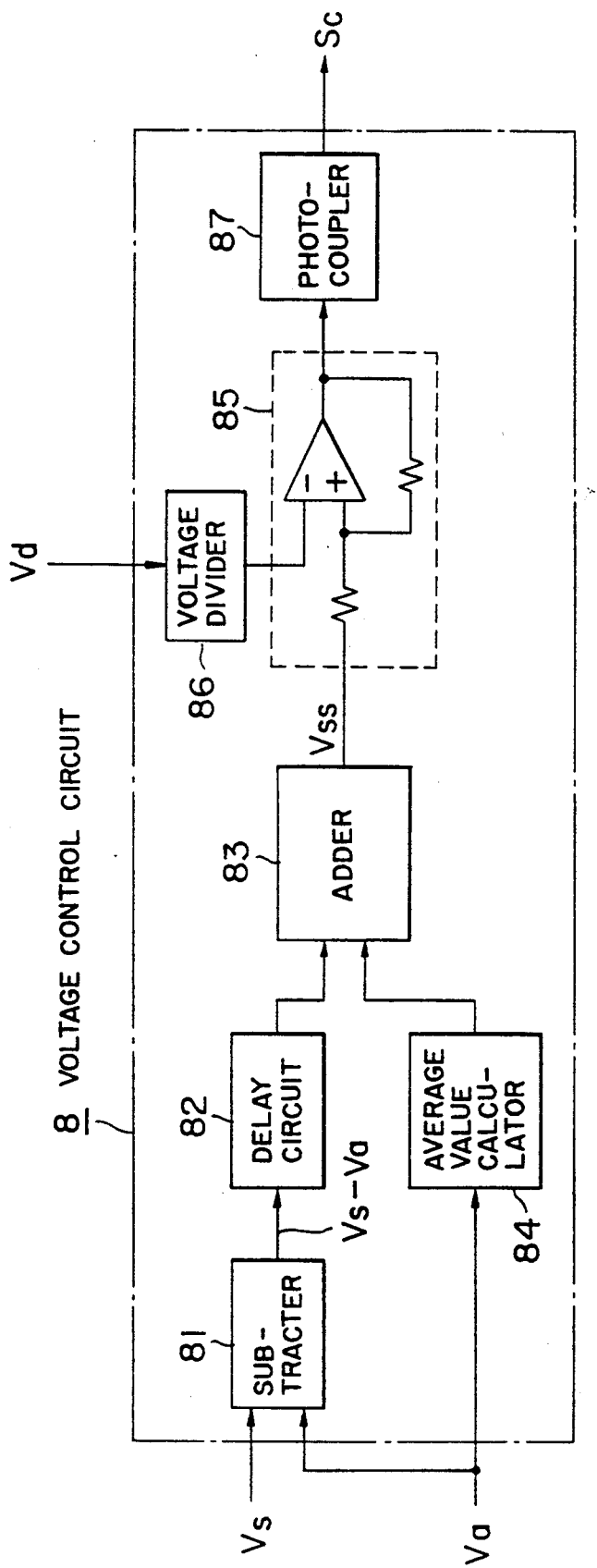
FIG. 5 is a block diagram showing the details of a voltage control circuit of the controller shown in FIG. 1.

FIG. 5 is a block diagram showing the detailed arrangement of the voltage control circuit 8. The voltage control circuit 8 receives the d.c. voltage command $V_s$ from the sampling circuit 7, the average voltage command $V_a$ from a microcomputer (not shown), and the output voltage $V_d$ from the voltage dropping chopper 2. A difference ($V_s - V_a$) between the d.c. voltage command $V_s$ and the average voltage command $V_a$ is calculated by a subtracter 81. The difference ($V_s - V_a$) is inputted, via a delay circuit 82 having a delay time of one cycle (inverter output frequency), to one input terminal of an adder 83. To the other input terminal of the adder 83, the average voltage command $V_a$ is inputted via an average value calculator 84. The average value calculator 84 constructed of, e.g., an integrator, calculates an average value of average voltage commands $V_a$ for about the past 10 minutes. An output signal of the adder 83 is inputted to a non-inverting input terminal of a d.c. differential amplifier 85. To the inverting input terminal of the d.c. differential amplifier 85, an input voltage to the inverter circuit 3, i.e., the output voltage $V_d$ of the voltage dropping chopper 2, is applied via a voltage divider 86. The d.c. differential amplifier 85 calculates the difference between the two inputs, the difference being applied as a control signal $S_c$ to the voltage dropping chopper 2.

Figure 6:
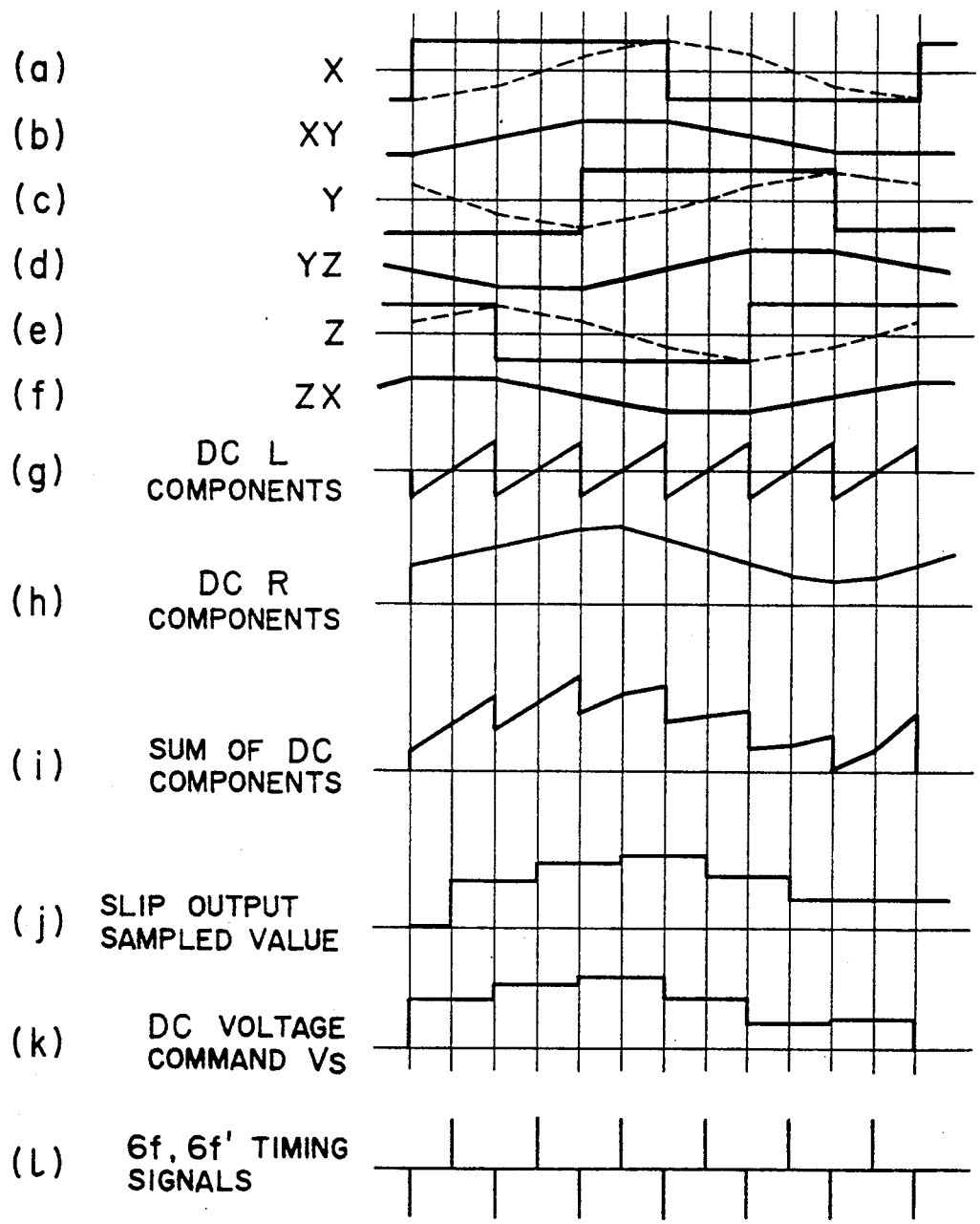
FIG. 6 is a timing chart used for explaining the operation of the controller shown in FIG. 1.

The overall operation of the embodiment thus constructed will be first described, and then the detailed operation of each circuit element will be described, with reference to the flow chart shown in FIG. 6.

A d.c. voltage applied to the d.c. input terminals P and N is smoothed by the smoothing capacitor 1 and applied to the voltage dropping chopper 2. The voltage dropping chopper 2 regulates the output level of the d.c. voltage and applies it to the inverter circuit 3. In the meantime, the control circuit 6 controls to turn on and off the transistors $Q_1$ to $Q_6$ constituting the inverter circuit 3. Therefore, the phase voltage having rectangular waveforms as indicated by solid lines in FIGS. 6(a), 6(c), and 6(e) are applied to the induction motor 4 and the phase currents having waveforms indicated by broken lines flow therein. The load impedance of the induction motor 4 is divided, as discussed previously, into resistive components and inductive components. Currents as shown in FIGS. 6(b), 6(d), and 6(f) flow at the interconnections between XY, YZ, and ZX of the three-phase delta connected resistive and inductive components. Consider these currents as being viewed from the d.c. power source side. The current flowing through the inductance components is a sawtooth alternating current having a frequency six times as high as the output frequency of the inverter circuit 3, as shown in FIG. 6(g). On the other hand, the current flowing through the resistive components is a fluctuating current with a slip change being superposed, as shown in FIG. 6(h). Therefore, the current detected at the d.c. input side of the inverter circuit 3 is a d.c. current having the waveform as shown in FIG. 6(i) and composed of the superposed sawtooth alternating current and fluctuating current. By sampling the voltage signal corresponding to the current shown in FIG. 6(i) in synchronism with the timing signal 6f when the inductive components become null, the sampled value representative of the current flowing through the resistive components, i.e., the slip output shown in FIG. 6(j), can be obtained without being influenced by the current flowing through the inductive components. This sampled slip value is held until the next sampling period so that the phase thereof delays by 30 degrees relative to the current shown in FIG. 6(i). Using the timing signal 6f′ whose phase is delayed by half the period relative to the timing signal 6f (30 degrees relative to the inverter output frequency) as shown in FIG. 6(l), the sampled value at the timing signal 6f′ corresponding to the timing delayed by one cycle relative to the output of the inverter circuit 3 is used as the d.c. voltage command which is the d.c. voltage command $V_s$ shown in FIG. 6(k). If a voltage corresponding to the d.c. voltage coxm1and is applied to the inverter circuit 3, it is possible to increase the motor current during the period while the slip is large, i.e., the load is large. In this manner, it becomes possible to suppress vibrations and noises within the low frequency range. As described above, the control circuit 6 generates the timing signal 6f and applies it to the sampling circuit 7. The sampling circuit 7 samples the voltage signal corresponding to the current detected by the current detecting resistor 9 in synchronism with the timing signal 6f. Furthermore, this sampled value is outputted as the d.c. voltage command $V_s$ at the timing signal 6f′ corresponding to the timing delayed by one cycle relative to the output of the inverter circuit 3. The voltage control circuit 8 compares the d.c. voltage command $V_s$ with the actual d.c. voltage Vd, and outputs the control signal Sc to the voltage dropping chopper 2 so as to decrease the difference between $V_s$ and $V_d$.

In accordance with the control signal $S_c$ from the voltage control circuit 8, base current control circuit 25 of the voltage dropping chopper 2 controls the transistor 21 to change its on/off-period (pulse width). This on/off voltage is smoothed by the smoothing capacitor 24 and supplied to the inverter circuit 3.

ROM 67 of the control circuit 6 stores PWM control data for 30 degrees (electrical angle) of the inverter output voltage, as described for example in Japanese Patent Application Laid-open No. 57-3582. This control data is read first in the forward direction and then in the reverse direction, in accordance with address designations by the up/down controller 66. As a result, the control data for 60 degrees (electrical angle) of the inverter output voltage is applied to the data selector 68, and at the same time, the control data inverted by the inverters $INV_2$ to $INV_4$ are applied to the data selector 68. In accordance with the output signals of the 360 degree counter 63, the data selector 68 selects the control data directly supplied from ROM 67 or the control data supplied via the inverters $INV_2$ to $INV_4$, alternately for every 60 degrees, and supplies it to the driver circuit 69. The inverter circuit 69 correspondingly controls to turn on and off the transistors $Q_1$ to $Q_6$ constituting the inverter circuit 3. The AND gates $AND_1$ and $AND_2$ generate the timing signals 6f and 6f′, which are then electrically insulated by the photocouplers 64 and 65 and the outputs therefrom.

Next, the 360 degree counter/decoder 71 of the sampling circuit 7 outputs pulse signals, which take an "H" level for 60 degrees at the timing signal 6f, whereas the counter/decoder 72 outputs pulse signals which take an "H" level for 60 degrees at the timing signal 6f' While the 360 degree counter/decoder 71 outputs an "H" level and the timing signal 6f is supplied, the sample/hold circuits 73 to 78 sample the d.c. current detecting value, and holds the sampled value for one cycle of the output of the inverter circuit 3. While the 360 degree counter/decoder 72 outputs an "H" level, the analog multiplexer 79 sequentially selects the data held by the sample/hold circuits 73 to 78, and outputs, as the d.c. voltage command, the data corresponding to the slip.

Adder 83 of the voltage control circuit 8 adds the difference ($V_s$-$V_a$) between the d.c. voltage command $V_s$ and the average voltage command $V_a$ obtained via the $V_a$ obtained via the average value calculator 84, and outputs it as a practical voltage reference $V_{ss}$. The d.c. differential amplifier 85 compares the voltage reference Vss with the actual d.c. voltage $V_d$ obtained via the voltage divider 86, to output a signal corresponding to the difference therebetween. This signal is electrically insulated by a photocoupler 87 and outputs as the control signal $S_c$. It is to be noted that the voltage reference $V_{ss}$ thus obtained includes siqnal components regarding the motor slip, i.e., a load change.

According to this embodiment, even there occurs a load change at any rotary position of the compressor, this load change can be compensated for, to thereby suppress rotation vibrations. Furthermore, a change in load torque is compensated by regulating the d.c. voltage, thereby improving the motor efficiency. Still further, this control is made through pulse amplitude modulation (PAM) so that oscillatory noises within the low frequency and voltage range can be suppressed.

In the above embodiment, the sampled value has been obtained as a voltage command for 60 degrees delayed by one cycle. The output period of the voltage command may be changed as desired depending upon a load change and a control system response time. Such an output period may be set by changing the timings of timing signals supplied to the analog multiplexer 79.

What is claimed is:

1. A slip detecting apparatus for detecting the slip of an induction motor which is controlled by an ivnerter having switching elements for converting a d.c. current into a variable-voltage and variable-frequency pseudo sine wave a.c. current through turn-on/off of the switching elements, said slip detecting apparatus comprising:

current detecting means for generating a voltage signal representative of a d.c. input current to said inverter;

timing signal generating means for generating timing signal which synchronizes with the d.c. input current when the inductive load components of the current flowing through said induction motor become null; and sampling means for sampling said voltage signal representative of said d.c. input current at predetermined electrical angles during every cycle period of an inverter output frequency in synchronism with said timing signal and outputting said sampled value as a slip indicating signal for said induction motor.

2. A controller for a compressor comprising:

an inverter having switching elements for converting a d.c. current into a variable-voltage and variable-frequency pseudo sine wave a.c. current through turn-on/off of the switching elements, and supplying said pseudo sine wave a.c. current to an induction motor for driving said compressor;

voltage regulating means for regulating the d.c. input voltage to said inverter;

current detecting means for generating a voltage signal representative of a d.c. input current to said inverter;

timing signal generating means for generating a timing signal which synchronizes with the d.c. input current when the inductive load components of the current flowing through said induction motor become null;

sampling means for sampling said voltage signal representative of said d.c. input current at predetermined electrical angles during every cycle period of an inverter output frequency in synchronism with said timing signal and outputting said sampled value as a slip indicating signal for said induction motor; and voltage controlling means for supplying said slip signal from said sampling means to said voltage regulating means as an output voltage command.

3. A controller for a compressor comprising:

an inverter having switching elements for converting a d.c. current into a variable-voltage and variable-frequency pseudo sine wave a.c. current through turn-on/off of the switching elements, and supplying said psuedo sine wave a.c. current to an induction motor for driving said compressor;

voltage regulating means for regulating the d.c. input voltage to said inverter;

current detecting means for generating a voltage signal representative of a d.c. input current to said inverter;

timing signal generating means for generating a timing signal which synchronizes with the d.c. input current when the inductive load components of the current flowing through said induction motor become null, and a second timing signal delayed by one half period relative to said first timing signal;

sampling means for sampling said voltage signal representative of said d.c. input current at predetermined electrical angles during every cycle period of an inverter output frequency in synchronism with said first timing signal to obtain a slip output sampling value, holding said slip output sampling value for one cycle of the output frequency of said ivnerter, and outputting, as a slip indicating signal for said induction motor, said slip output sampling value delaying by one cycle at said second timing signal; and voltage controlling means for supplying said slip signal from said sampling means to said voltage regulating means as an output voltage command.

* * * * *